United States Patent [19]

Yamaguchi et al.

[11] Patent Number: 5,511,823
[45] Date of Patent: Apr. 30, 1996

[54] IMPACT ABSORBING TYPE STEERING COLUMN APPARATUS WITH A MOTORIZED POWER STEERING DEVICE

[75] Inventors: Mikio Yamaguchi; Sakae Matsumoto, both of Takasaki, Japan

[73] Assignee: NSK Ltd., Tokyo, Japan

[21] Appl. No.: 248,211

[22] Filed: May 24, 1994

[30] Foreign Application Priority Data

May 28, 1993 [JP] Japan ................. 5-033166 U

[51] Int. Cl.$^6$ ................................................ B62D 1/19
[52] U.S. Cl. ........................ 280/777; 188/371; 74/492
[58] Field of Search ........................... 280/777, 780, 280/779; 188/371, 376, 377, 374; 74/492

[56] References Cited

U.S. PATENT DOCUMENTS

| | | | |
|---|---|---|---|
| 3,538,783 | 11/1970 | Butts | 188/371 |
| 3,612,223 | 10/1971 | Shiomi et al. | 188/371 |
| 3,923,319 | 12/1975 | Nonaka et al. | 280/777 |
| 4,006,647 | 2/1977 | Oonuma et al. | 188/371 |
| 4,098,141 | 7/1978 | Yamaguchi | 74/492 |
| 4,194,411 | 3/1980 | Manabe et al. | 188/376 |
| 4,627,306 | 12/1986 | Berenjian | 188/371 |
| 4,805,478 | 2/1989 | Beauch | 74/492 |
| 4,951,522 | 8/1990 | Chowdhury et al. | 188/371 |
| 5,193,848 | 3/1993 | Faulstroh | 280/777 |
| 5,228,359 | 7/1993 | Thomas | 188/371 |

FOREIGN PATENT DOCUMENTS

| | | | |
|---|---|---|---|
| 0581432 | 2/1994 | European Pat. Off. | 280/777 |
| 2821707 | 11/1978 | Germany | 280/777 |
| 3427211 | 1/1986 | Germany . | |
| 3544350 | 6/1987 | Germany . | |
| 48-87528 | 11/1973 | Japan . | |
| 57-200478 | 12/1982 | Japan . | |
| 61-57462 | 3/1986 | Japan . | |
| 1-249571 | 10/1989 | Japan . | |
| 0132468 | 6/1991 | Japan | 280/777 |
| 6-1115 | 1/1994 | Japan . | |

*Primary Examiner*—Margaret A. Focarino
*Assistant Examiner*—Peter C. English
*Attorney, Agent, or Firm*—Shapiro and Shapiro

[57] ABSTRACT

An impact absorbing type steering column apparatus with a motorized power steering device secures an amount of displacement in a secondary collision in spite of the presence of a housing for supporting an electric motor. A housing fixed to the fore end portion of the steering column is supported on a vehicle body by an energy absorbing member. During a secondary collision, the energy absorbing member permits the forward displacement of the steering shaft and steering column while being plastically deformed. When the distance between a first and a second universal joint is shortened with the displacement, the full length of a transmission shaft is shortened.

8 Claims, 10 Drawing Sheets

IMPACT ABSORBING TYPE STEERING COLUMN APPARATUS WITH A MOTORIZED POWER STEERING DEVICE

BACKGROUND OF THE INVENTION

1. Field of the Invention

An impact absorbing type steering column apparatus with a motorized power steering device according to the present invention achieves the reduction of steering force by utilizing the rotational force of an electric motor and also achieves the protection of the seat occupant's life during a collision by the steering column being made capable of absorbing an impact during a collision.

2. Related Background Art

A steering force assisting device called a power steering device has been widely used to reduce a force (steering force) required to turn a steering wheel during a change of course. Also, in small automobiles such as light cars, an electric motor is generally utilized as the power source of the power steering device.

During a collision of an automobile, there occurs a so-called secondary collision which is the collision of the driver against the steering wheel, subsequently to a so-called primary collision which is the collision of one automobile with another automobile or the like. With a view to minimize the impact received by the driver during the secondary collision and achieve the protection of the driver's life, it has generally been practised to adopt the impact absorbing type design in which the steering wheel moves forwardly in case of the secondary collision while absorbing the impact.

As steering column apparatuses of the impact absorbing type used for such a purpose, there have heretofore been proposed ones described in various publications such as Japanese Patent Application Laid-Open No. 48-87528, Japanese Patent Application Laid-Open No. 61-57462, Japanese Patent Application Laid-Open No. 1-249571 and Japanese Utility Model Application Laid-Open No. 57-200478, and some of them have been actually used. Also, an apparatus of such structure as shown in FIG. 15 of the accompanying drawings has heretofore been conceived as an apparatus to be combined with motorized power steering.

In Figure. 15, the reference numeral 1 designates a steering shaft having a steering wheel (not shown) fixed to the upper end thereof and rotated in the direction of operation of the steering wheel, and comprising a combination of an inner shaft 2 and an outer shaft 3. This steering shaft 1 has its full length contracted by a collapsible structure, incorporated in the coupling portion of the inner shaft 2 and the outer shaft 3, when an axial impact is applied thereto.

The steering shaft 1 is inserted in a cylindrical steering column 4, which comprises an outer column 5 and an inner column 6 combined in a telescopic manner and which, when an axial impact is applied thereto, is also made into a collapsible structure which contracts its full length while absorbing this impact. Such a steering column 4 has its intermediate and lower end portions supported on a portion of a vehicle body 9 such as the underside of a dashboard by an upper support bracket 7 and a lower support bracket 8.

The upper support bracket 7 formed by bending a metallic plate is fixed as by welding to the outer peripheral surface of the intermediate portion of the outer column 5 of the steering column 4, and is supported on the vehicle body 9 through a restraining member 10 made of a slippery material.

An electric motor 11 which is the power source of the power steering device is supported by a housing 12 connected to the fore end portion of the steering column 4. A worm (not shown in FIG. 15) fixed to the output shaft of the electric motor 11 is brought into meshing engagement with a worm wheel (not shown in FIG. 15) fixed to the outer peripheral surface of the front portion of the steering shaft 1 whereby a force in the direction of rotation can be imparted to the steering shaft 1 during the electrical energization of the electric motor 11.

A connection cylinder portion 15 is formed on the rear end portion of the housing 12, and the fore end portion of the inner column 6 which constitutes the steering column 4 is fitted over the connection cylinder portion 15, whereby the steering column 4 and the housing 12 are connected together. The fore end portion of the inner column 6 is enlarged in its diameter so as to permit it to be fitted over the connection cylinder portion 15. The lower support bracket 8 is provided between the housing 12 and the vehicle body 9.

When an impact is applied to the steering wheel with a secondary collision caused by a collision accident, this impact is immediately transmitted to the steering shaft 1 and steering column 4, whereby these two members 1 and 4 are strongly axially pushed.

When the impact force thus applied in the axial direction of the steering shaft 1 and steering column 4 becomes greater than the sum total of the coupling force of the inner shaft 2 and outer shaft 3, the coupling force of the inner column 6 and outer column 5 and the coupling force of the upper support bracket 7 and restraining member 10, the upper support bracket 7 slips out of the restraining member 10 and the steering shaft 1 and steering column 4 become displaceable.

As a result, the steering shaft 1 and steering column 4 are displaced axially forwardly (leftwardly as viewed in FIG. 15) as a result of the aforementioned impact force. During this displacement, the impact applied from the driver's body through the steering wheel to the steering shaft 1 and steering column 4 is absorbed by the coupled frictional force of the inner shaft 2 and outer shaft 3 constituting the steering shaft 1, the coupled frictional force of the inner column 6 and outer column 5 constituting the steering column 4, and the plastic deformation of an energy absorbing member (not shown) provided between the outer column 5 and the restraining member 10.

An impact absorbing type steering column apparatus with a motorized power steering device according to the present invention secures the flexural rigidity of the steering column and yet increases the amount of displacement of the steering wheel, i.e., the amount of contraction of the steering shaft and steering column, during a collision accident, thereby achieving the ease of designing for security.

In the case of the conventional structure shown in FIG. 15, the fore end portion of the inner column 6 is enlarged in its diameter, and a stepped portion 34 is thus formed on that portion of the inner column 6 which is near the fore end thereof. Consequently, even when the full length of the steering column 4 is shortened with a collision accident, the full length of the steering column 4 can only be shortened by an amount corresponding to the distance s in FIG. 15 until the fore end edge of the outer column 5 strikes against the aforementioned stepped portion 34.

The simple rearward movement of the fore end edge of the outer column 5 to avoid the foregoing problem would shorten the length of mating of the outer column 5 and the inner column 6 and cause the flexural rigidity of the steering column 4 to be reduced. Such a measure therefore, cannot be adopted. Also, if the distance L between the upper support bracket 7 and the connection cylinder portion 15 were made great, the flexural rigidity of the steering column 4 could be secured and yet the aforementioned distance could be made long. However, since the distance L is limited to some extent depending on the dimensions of the various portions of the vehicle, it is difficult in design to make this distance L long.

SUMMARY OF THE INVENTION

An impact absorbing type steering column apparatus with a motorized power steering device according to the present invention eliminates such inconveniences.

The impact absorbing steering column apparatus with a motorized power steering device according to a first aspect of the present invention is provided with a steering shaft having a steering wheel fixable to the rear end thereof; a steering column having the steering shaft rotatably received therein and not contracting by the impact of a collision, a housing coupled to the fore end portion of the steering column, an electric motor supported by the housing for imparting a force in the direction of rotation to the steering shaft upon electrical energization, an energy absorbing member made of a plastically deformable material and extended between the housing and a vehicle body to thereby support the fore end portion of the steering column on the vehicle body, a first universal joint having one side thereof coupled to the fore end portion of the steering shaft which protrudes from the fore end of the housing, a transmission shaft having one end thereof coupled to the other side of the first universal joint, and a second universal joint having one end thereof coupled to the other end of the transmission shaft. At least one of the fore end portion of the steering shaft which protrudes from the housing and the transmission shaft is made retractile and capable of transmitting a rotational force.

In the case of the impact absorbing type steering column apparatus with a motorized power steering device according to the first aspect of the present invention constructed as described above, when an impact force which pushes the steering shaft and steering column forward is applied by a secondary collision resulting from a collision accident, the energy absorbing member is plastically deformed and yet permits the steering shaft and steering column to be displaced forwardly.

The impact absorbing steering column apparatus with a motorized power steering device according to a second aspect of the present invention is provided with a steering shaft having a steering wheel fixable to the rear end thereof, a steering column having the steering shaft rotatably received therein, a housing coupled to the fore end portion of the steering column, an electric motor supported by the housing for imparting a force in the direction of rotation to the steering shaft upon electrical energization, an energy absorbing member made of a plastically deformable material and extended between the housing and a vehicle body to thereby support the fore end portion of the steering column on the vehicle body, a first universal joint having one side thereof coupled to the fore end portion of the steering shaft which protrudes from the fore end of the housing, a transmission shaft having one end thereof coupled to the other side of the first universal joint, and a second universal joint having one end thereof coupled to the other end of the transmission shaft. At least one of the fore end portion of the steering shaft which protrudes from the housing and the transmission shaft is made retractile and capable of transmitting a rotational force. Also, the respective full lengths of the steering shaft and the steering column are contracted when receiving an impact in the axial direction thereof.

In the case of the impact absorbing type steering column apparatus with a motorized power steering device according to the second aspect of the present invention constructed as described above, when an impact force which pushes the steering shaft and steering column forward is applied by a secondary collision resulting from a collision accident, the energy absorbing member is plastically deformed and the steering shaft and the steering column are contracted thereby to allow the steering shaft and the steering column to be displaced forwardly.

According to the present invention, when the energy absorbing member is deformed and the steering shaft and the steering column are displaced forwardly, the full length of at least one of the fore end portion of the steering shaft and the transmission shaft is shortened to thereby absorb the displacement of the second universal joint.

Also, it is possible to determine the amounts of displacements of the steering shaft and the steering column during a secondary collision independently of the presence of the housing, whereby the design for securing a sufficient amount of displacement becomes easy.

DETAILED DESCRIPTION OF THE PREFERRED EMBODIMENTS

Figure 1:
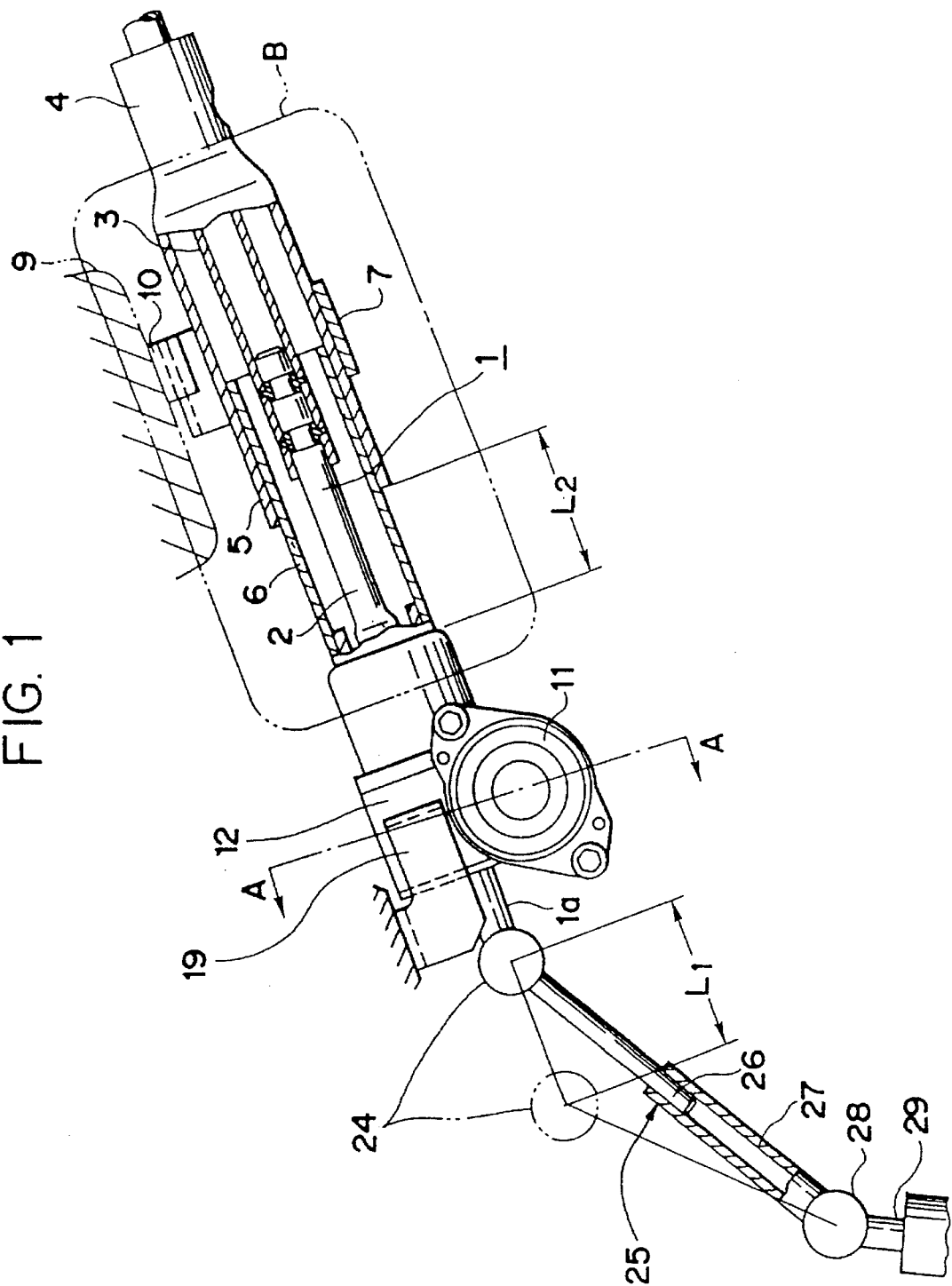
FIG. 1 is a longitudinal cross-sectional side view showing principal portions of a first embodiment of the present invention.

Referring to the drawings, wherein like reference numerals designate identical or corresponding parts throughout all the embodiments of the invention, FIGS. 1 to 4B show a first embodiment of the present invention. A steering shaft 1 of an impact absorbing type steering column apparatus with a motorized power steering device according to the present invention is capable of fixing a steering wheel to the rear end thereof and contracting by the impact during a collision.

Figure 4A:
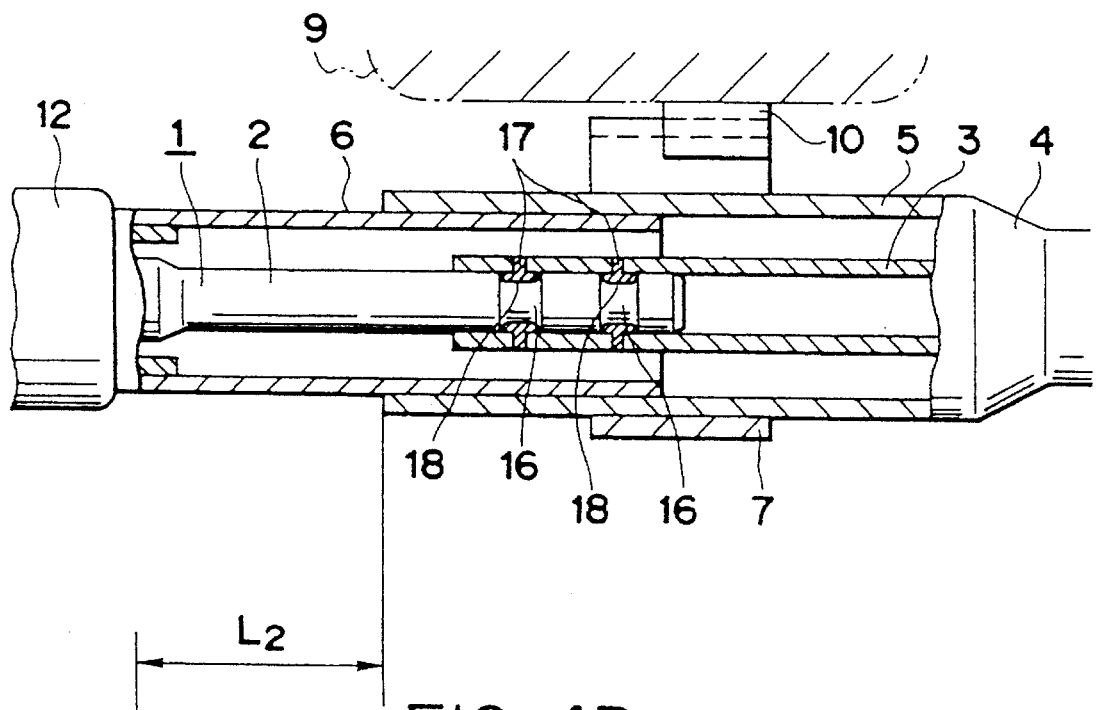
FIGS. 4A and 4B are enlarged views of a B-section in FIG. 1 showing the states of the steering column before and after contraction.
Figure 4B:
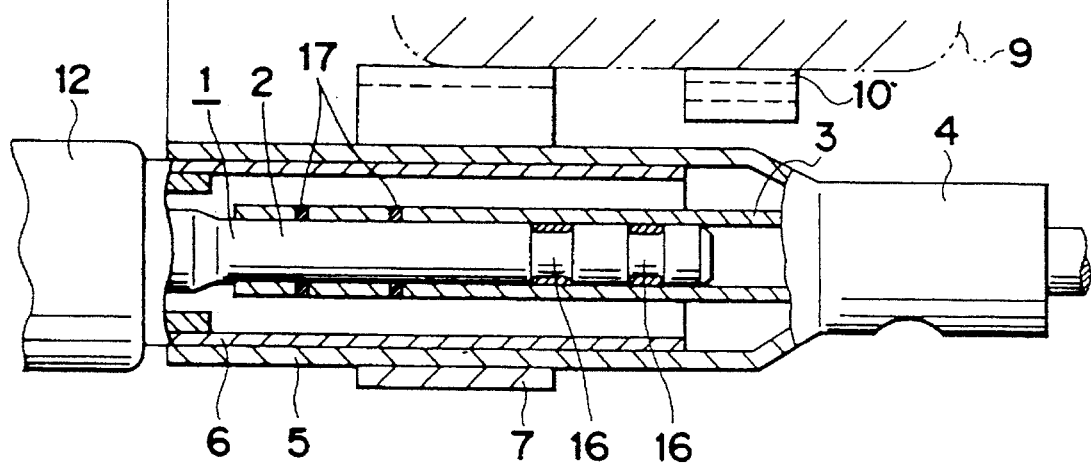

That is, as shown in FIGS. 4A and 4B, owing to a collapsible structure incorporated in the coupling portion of an inner shaft 2 and an outer shaft 3, when an axial impact is applied to the steering shaft 1, the full length thereof is contracted while absorbing the energy generated by this impact. The collapsible structure is constituted of thickness reduced portions 16, 16 of the inner shaft 2, through-holes 17 formed in the outer shaft 3 opposite to the thickness reduced portions 16, 16 and synthetic resin members 18 deposited in the through-holes 17 as well as gaps between the thickness reduced portions 16, 16 and the outer shaft 3.

Usually, the inner shaft 2 and the outer shaft 3 will not be displaced relative to each other because of the linking force of the synthetic resin members 18. However, when a large axial impact force is applied thereto by a collision accident, the synthetic resin members 18 are torn to allow both the shafts 2 and 3 to be displaced in the axial direction, whereby the full length of the steering shaft 1 is contracted.

The steering shaft 1 is inserted in a steering column 4, which supports this steering shaft 1 only for rotation by a deep groove type ball bearing (not shown). The steering column 4 also has a collapsible structure, so that it is contracted by the impact of a collision. That is, as shown in FIGS. 4A and 4B, the steering column 4 has an outer column 5 and an inner column 6 combined in a telescopic manner similarly to the prior-art structure. Usually, both the columns 5 and 6 will not be displaced relative to each other because of the frictional force produced between the internal surface of the outer column 5 and the external surface of the inner column 6. However, when an axial impact is applied thereto by a collision accident, both the columns 5 and 6 are displaced in the axial direction to cause the full length of the steering column 4 to be contracted while absorbing the energy generated by this impact.

A housing 12 is connected to the fore end (the left lower end as viewed in FIGS. 1 and 4A, 4B of the steering column 4, and an electric motor 11 which is the power source of a power steering device is supported by the housing 12. By the electric motor 11, a force in the direction of rotation can be imparted to the steering shaft 1 through a worm 13 and a worm wheel 14 (See FIG. 2).

Figure 2:
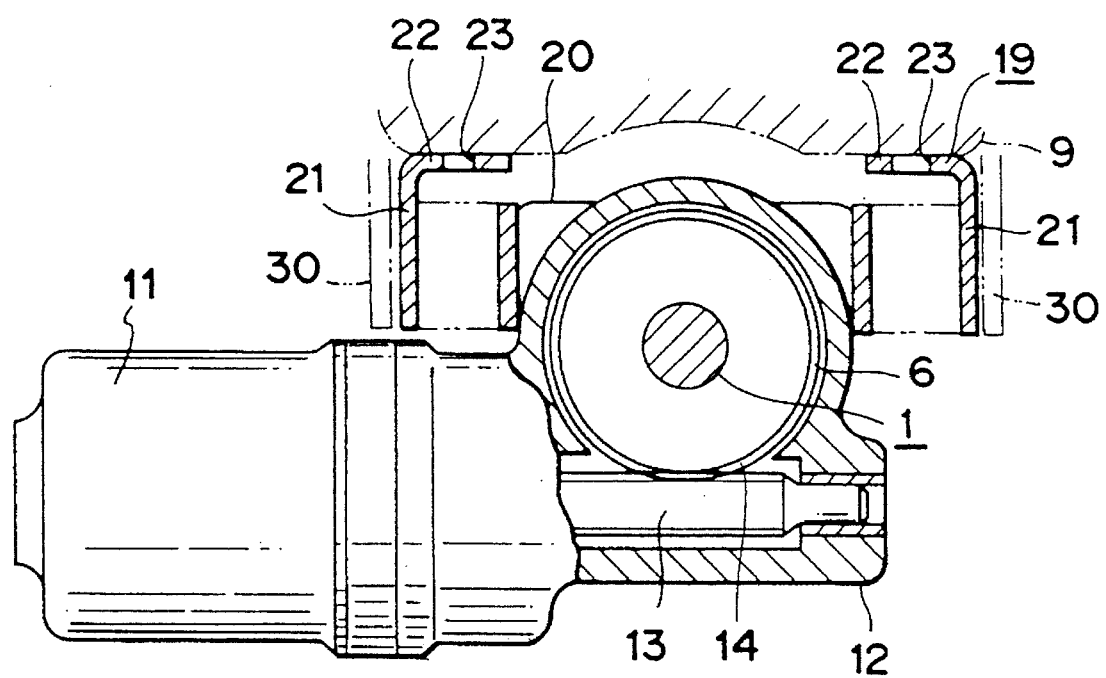
FIG. 2 is an enlarged cross-sectional view taken along the line A—A of FIG. 1.
Figure 3A:
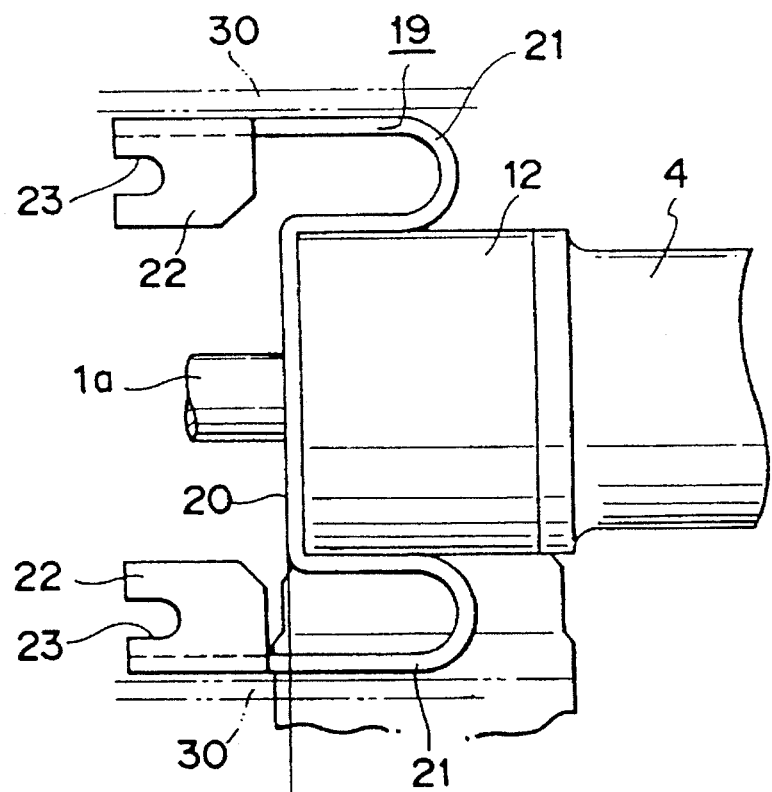
FIGS. 3A and 3B are views showing the states of an energy absorbing member before and after deformation as it is seen from above FIG. 1.
Figure 3B:
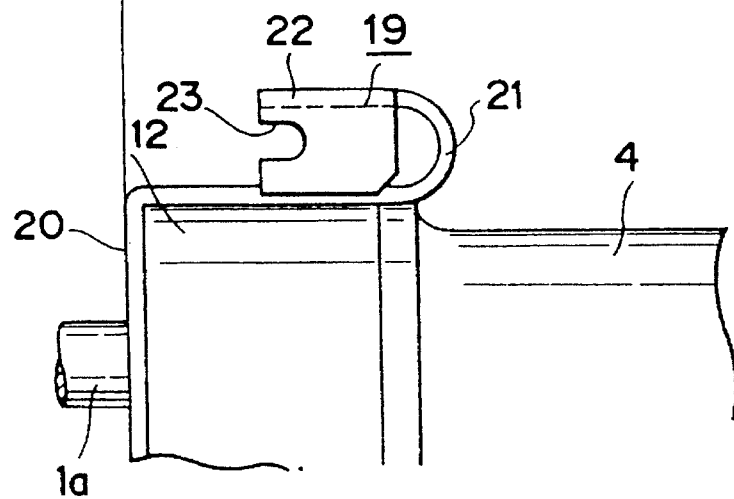

The base 20 of an energy absorbing member 19 is coupled to the front end surface of the housing 12. The energy absorbing member 19 is made of a metallic plate which is a plastically deformable material, and fitting portions 22, 22 are provided on the fore end portions of plastically deformable portions 21, 21 provided at the left and right (upper and lower as seen in FIGS. 3A and 3B) sides of the base 20. The plastically deformable portions 21, 21 each form a curved portion opening axially of the steering shaft by a band-like portion formed on the metallic plate being turned back as shown in FIGS. 2 and 3A, and are plastically deformable from the state of FIG. 3A into the state of FIG. 3B when the housing 12 is axially displaced.

The fitting portions 22, 22 provided on the fore end portions of the plastically deformable portions 21, 21 are formed with cut-aways 23, 23 for inserting thereinto screws for fixing the fitting portions 22, 22 to the lower surface of a vehicle body 9. The energy absorbing member 19 having such a configuration is extended and provided between the housing 12 and the vehicle body 9 by coupling and fixing the base 20 to the front end surface of the housing 12, and fixing the fitting portions 22, 22 to the vehicle body 9, and supports the fore end portion of the steering column 4 on the vehicle body 9.

Further, one side of a first universal joint 24 is coupled to the fore end portion of a steering shaft member 1a which protrudes from the fore end of the steering column 4, and the other side of the first universal joint 24 is coupled to one end of a transmission shaft 25. The steering shaft member 1a is connected to the steering shaft 1 by a torsion bar (not shown) provided in the housing 12. The transmission shaft 25 is made retractile and capable of transmitting a rotational force by the end portion of an inner shaft 26 and the end portion of an outer shaft 27 being engaged therewith as by splines. One end of the shaft 25 is coupled to the other side of the first universal joint 24 and the other end thereof is coupled to one end of a second universal joint 28. The other end of the second universal joint 28 is connected to the input shaft 29 of a steering gear.

In the case of the impact absorbing type steering column apparatus with a motorized power steering device according to the present invention constructed as described above, when an impact force which pushes the steering shaft 1 and steering column 4 forward is applied by a secondary collision resulting from a collision accident, the plastically deformable portions 21, 21 of the energy absorbing member 19 permit the steering shaft 1 and steering column 4 to be displaced forwardly while being plastically deformed from the state shown in FIG. 3A into the state shown in FIG. 3B.

When the steering shaft 1 and steering column 4 are thus displaced forwardly, the first universal joint 24 provided on the fore end portion of the steering shaft member 1a connected to the steering shaft 1 as earlier described is displaced forwardly from the solid line position of FIG. 1 to the chain line position of FIG. 1, whereby the distance between the first universal joint 24 and the second universal joint 28 is shortened. So, the full length of the transmission shaft 25 provided between these joints 24 and 28 is shortened to thereby absorb the variation in the distance between the two joints 24 and 28.

When an impact for pushing the steering column 4 forwardly is applied by a secondary collision, the steering column 4 is displaced forwardly, and consequently, the relative displacement of the inner column 6 and the outer column 5 and that of the inner shaft 2 and the outer shaft 3 occur according to deformation of the energy absorbing member 19 thereby to cause the respective full lengths of the steering column 4 and the steering shaft 1 to be contracted.

As a result, the distance in which the steering wheel can be displaced forwardly by the impact of a secondary collision becomes the sum ($L_1 + L_2$) of the displacement amount $L_1$ of the steering column 4 according to the energy absorbing member 19 and the contraction amount $L_2$ of the steering column 4. Therefore, even though the contraction amount $L_2$ cannot be secured sufficiently when the length of the mating portion of the outer column 5 and the inner column 6 is made long in order to obtain the flexural rigidity of the steering column 4, the total displacement amount of the steering wheel can be secured sufficiently.

Further, the respective full lengths of the transmission shaft 25, the steering shaft 1 and the steering column 4 are contracted also when the second universal joint 28 is moved rearwardly due to a primary collision prior to a secondary collision.

An upper support bracket 7 supporting the intermediate portion of the outer column 5 constituting the steering column 4 on the vehicle body 9 is designed to permit only the forward displacement of the steering column 4 and to block the rearward displacement thereof. Therefore, it will never happen that during a primary collision, the outer column 5 is displaced rearwardly and the steering wheel fixed to the rear end portion of the steering shaft 1 is pushed up toward the driver.

According to the impact absorbing type steering column apparatus with a motorized power steering device in accordance with the present invention, the amounts of displacement of the steering shaft 1 and steering column 4 during a secondary collision can be determined independently of the presence of the housing 12 for the motorized power steering device, and the design for securing sufficient amounts of displacement becomes easy.

Figure 5:
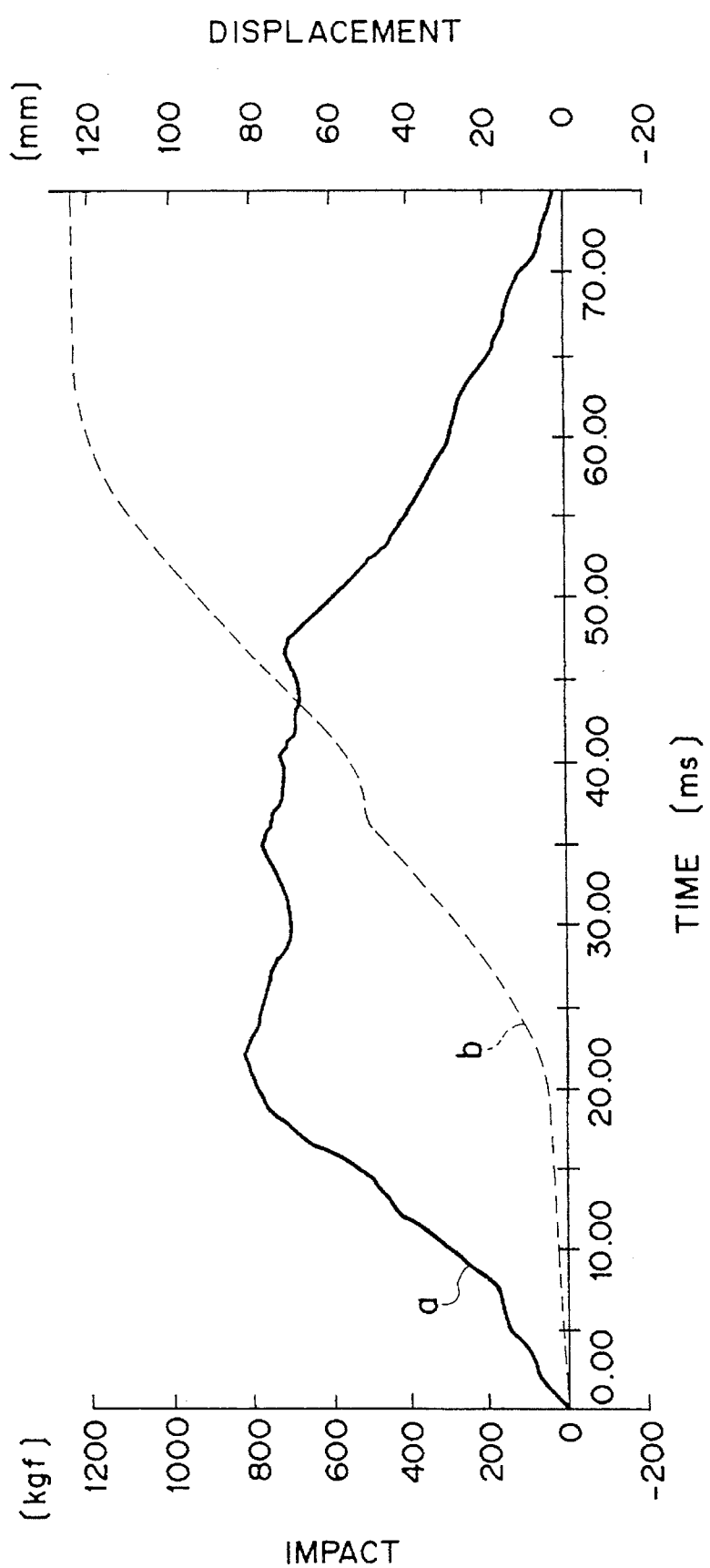
FIG. 5 is a graph showing the relations among the lapse time during a secondary collision and the magnitude of impact applied to the driver's body and the amount of displacement of the steering wheel.

Also, sufficiently effective impact absorption can be accomplished by suitably determining the material of the energy absorbing member 19 and the dimensions of the plastically deformable portions 21, 21. For example, according to an experiment carried out by the inventor with SPHC used as the material of the energy absorbing member 19 and with the thickness of the plastically deformable portions 21, 21 determined to 2.9 mm and the width thereof determined to 30–26.5 mm (the width has been made greater from halfway of these portions so that a load required for initial displacement may be small and become great later), the relations among the lapse time during a secondary collision and the magnitude of the impact applied to the driver's body when it collided with the steering wheel and the amount of displacement of the steering column were such as shown in FIG. 5. In FIG. 5, the solid line a represents the relation between the lapse time and the magnitude of the impact applied to the driver's body, and the broken line b represents the relation between the lapse time and the amount of displacement of the steering column. This FIG. 5 was obtained by way of an experiment based on FMVSS No. 203, and it was confirmed that the maximum value of the impact applied to the driver was 850 kgf and satisfied the safety standard (1,134 kgf or less) with a margin. The collision speed was 4/3 times the standard speed, i.e., 32.1 km/h.

In order to prevent each plastically deformable portion 21, 21 from being displaced sideways in the event of a secondary collision to thereby cause irregularity of the impact absorbing performance, guide plates 30, 30 can be provided outside the respective plastically deformable portions 21, 21 as indicated by chain lines in FIGS. 2 and 3.

Figure 6:
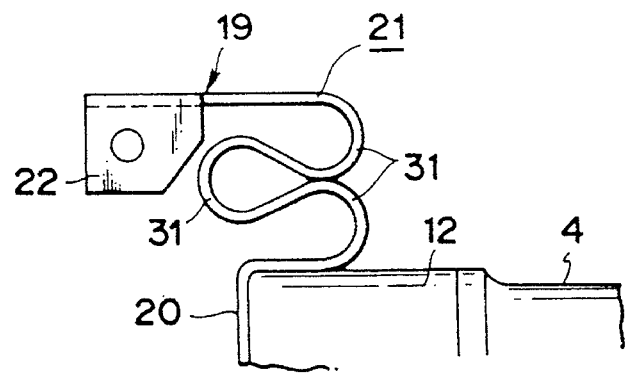
FIG. 6 is a plan view showing principal portions of a second embodiment of the present invention.
Figure 7:
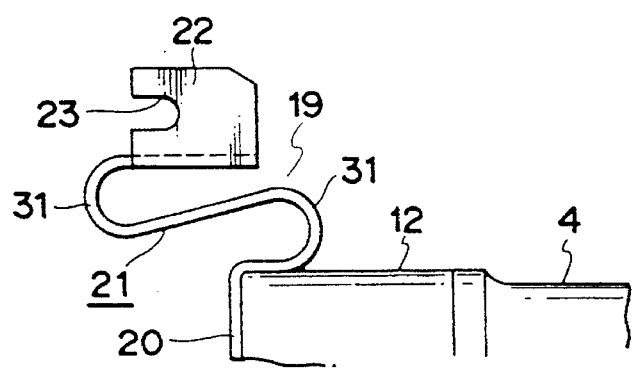
FIG. 7 is a plan view showing principal portions of a third embodiment of the present invention.
Figure 8:
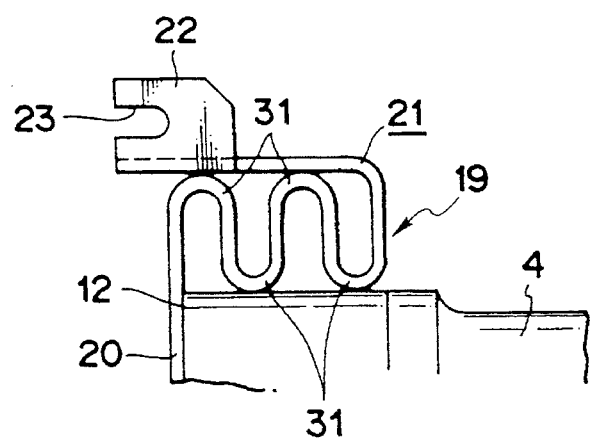
FIG. 8 is a plan view showing principal portions of a fourth embodiment of the present invention.

FIGS. 6 to 8 show alternative forms of the plastically deformable portion 21 of the energy absorbing member 19 as second to fourth embodiments of the present invention. In the second embodiment shown in FIG. 6, three curved portions 31 are provided between the base 20 and the fitting portion 21 to thereby increase the amount of stretch of the plastically deformable portion 21 during a secondary collision. In the third embodiment shown in FIG. 7, two curved portions 31 are provided. Further, in the fourth embodiment shown in FIG. 8, the direction of the curved portions 31 is made different by 90° from that in the first to third embodiments, thereby also increasing the amount of stretch during a secondary collision. In the other points than increasing the amount of stretch, these embodiments are similar to the first embodiment.

Figure 9:
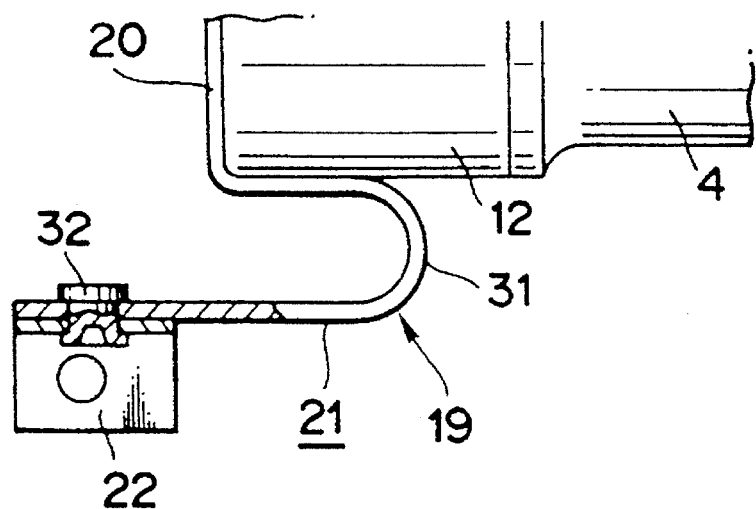
FIG. 9 is a plan view showing principal portions of a fifth embodiment of the present invention.
Figure 10:
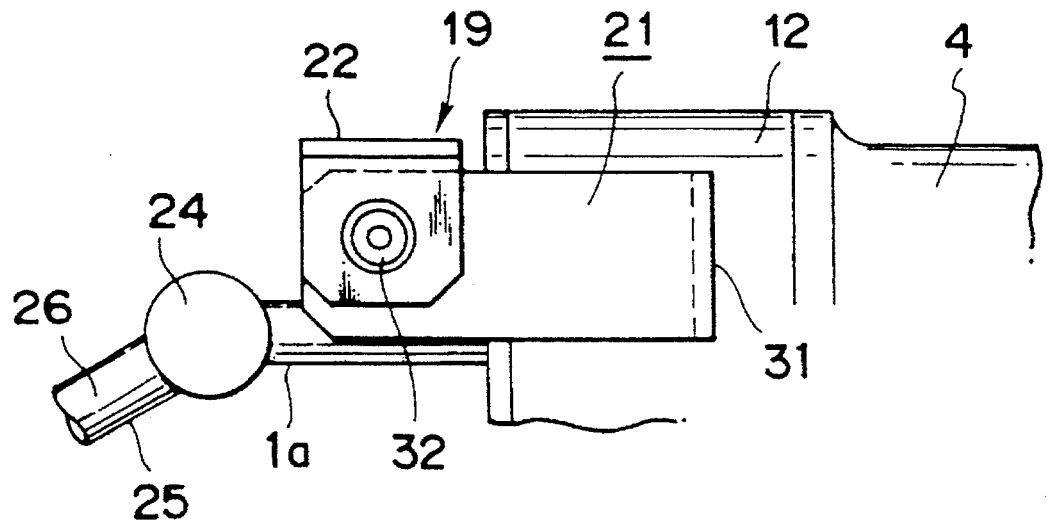
FIG. 10 is a view of the fifth embodiment as it is seen from below FIG. 9.

FIGS. 9 and 10 show a fifth embodiment of the present invention. In this embodiment, a fitting portion 22 is pivotally mounted on the fore end portion of the plastically deformable portion 21 constituting the energy absorbing member 19, by means of a transverse shaft 32. Accordingly, in the case of the present embodiment, with the fitting portion 22 remaining fixed to the vehicle body, the angle of inclination of the steering column 4 having the plastically deformable portion 21 and housing 12 fixed to the fore end portion thereof can be adjusted. That is, the present embodiment can be utilized in a case where there is also provided a so-called tilt type steering device in which the height of the steering wheel is adjusted.

Figure 11:
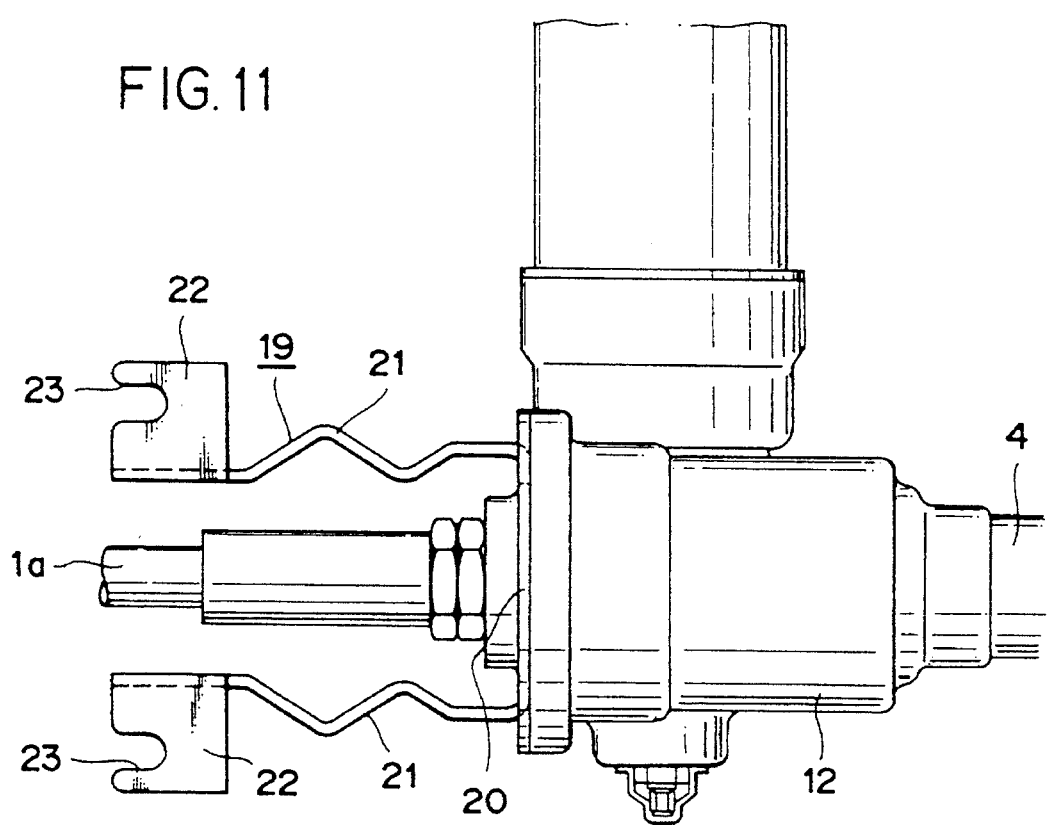
FIG. 11 is a plan view showing principal portions of a sixth embodiment of the present invention.

FIG. 11 shows a sixth embodiment of the present invention. This embodiment is designed such that the plastically deformable portions 21 alleviate an impact while being contracted. That is, the plastically deformable portions 21 in the present embodiment are formed zigzag relative to the axial direction of the steering column 4 and housing 12, and are designed to shorten their full length while alleviating a great impact force whenever such impact force acts over this axial direction.

Also, the fore end portion of the steering shaft 1a which protrudes from the housing 12 is designed such that the full length is shortened when an axial force is applied. During a collision, the steering shaft 1a is contracted instead of or with the transmission shaft 25 (FIG. 1). When the steering shaft 1a is contracted with the transmission shaft 25, the contraction stroke can be made great. In the other points, the present embodiment is similar to the aforedescribed first to fifth embodiments.

Figure 12:
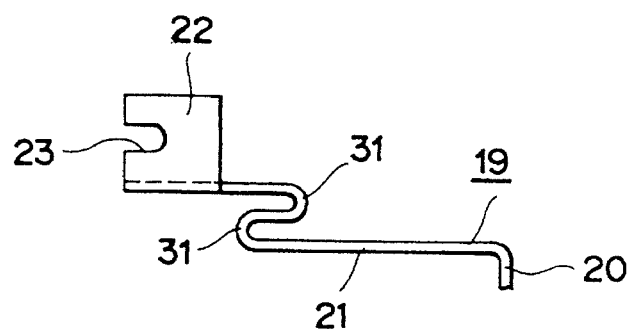
FIG. 12 is a plan view showing principal portions of a seventh embodiment of the present invention.
Figure 13:
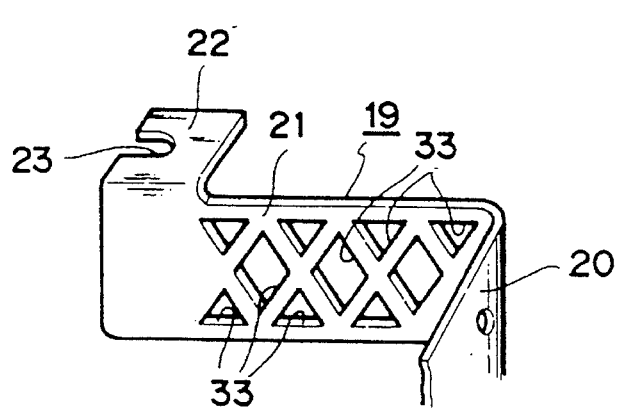
FIG. 13 is a plan view showing principal portions of an eighth embodiment of the present invention.

A seventh embodiment shown in FIG. 12 or an eighth embodiment shown in FIG. 13 can also be adopted as the shape of the plastically deformable portion 21 which alleviates an impact force while being contracted. The embodiment shown in FIG. 12 is one in which two curved portions 31, 31 are formed in the plastically deformable portion 21 as in the embodiment shown in FIG. 7 and the fitting portion is greatly protruded forwardly relative to the base 20, and the embodiment shown in FIG. 13 is one in which the plastically deformable portion 21 is formed with a plurality of through-holes 33, 33, whereby the plastically deformable portion 21 is made compressively deformable.

Figure 14:
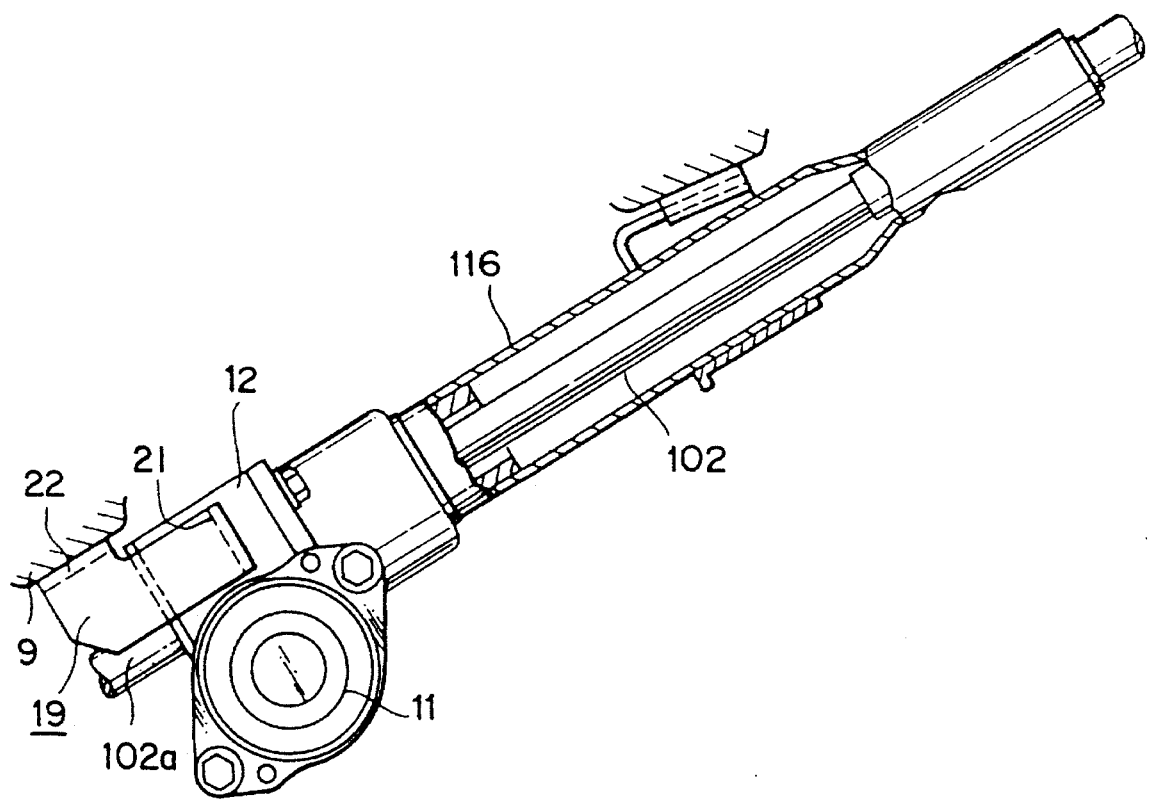
FIG. 14 is a longitudinal cross-sectional side view showing principal portions of a ninth embodiment of the present invention.
Figure 15:
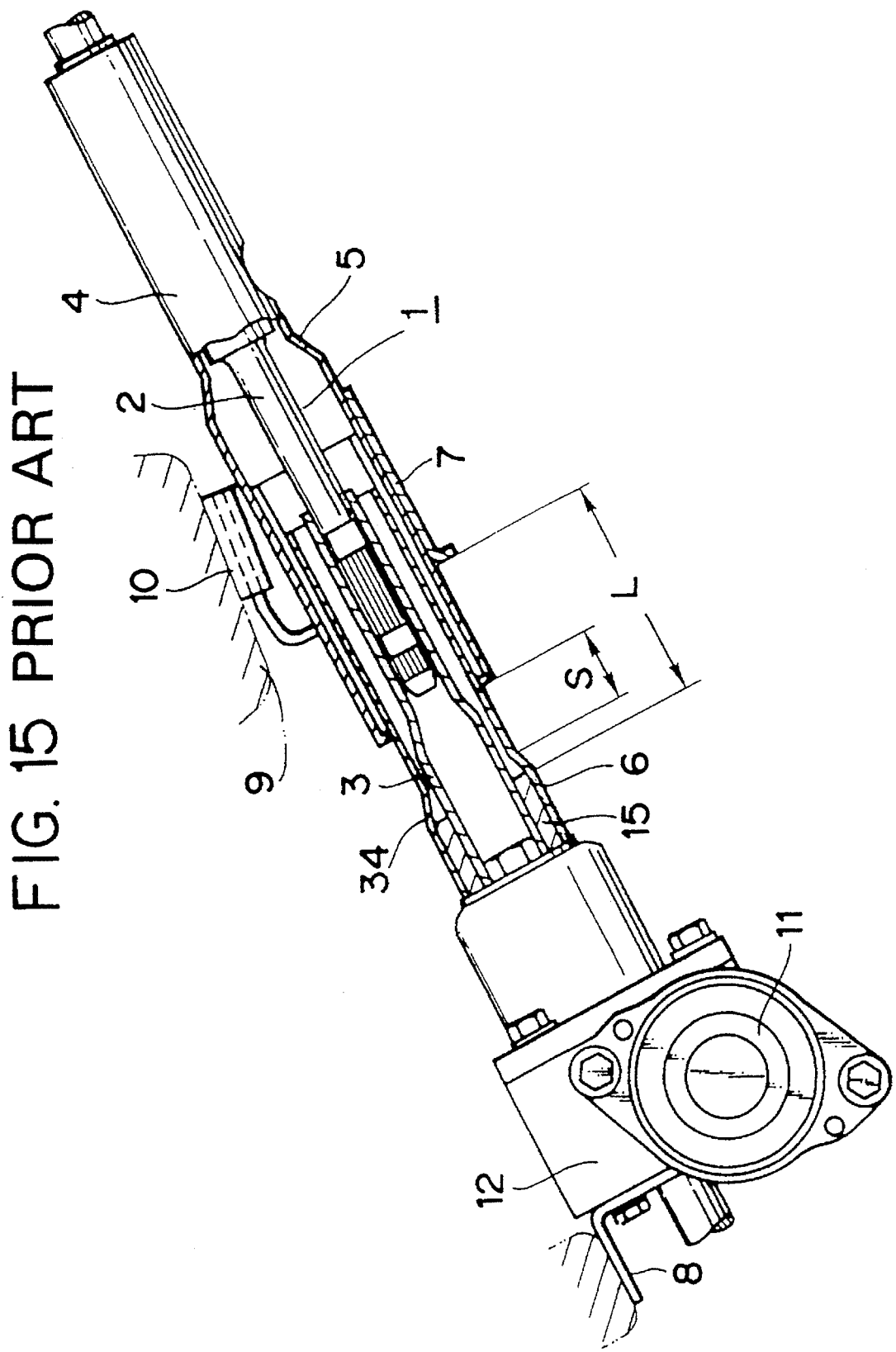
FIG. 15 is a longitudinal cross-sectional side view showing portions of an example of the conventional structure.

FIG. 14 shows a ninth embodiment of the present invention disclosed in the Japanese U.M. Application Laid-Open No. 6-1115 laid open on Jan. 11, 1994 ( Japanese U.M. Application No. 4-48207 filed on Jun. 28, 1992), whose inventive entity is the same as that of the present application. In FIG. 14, a steering shaft 102 with a steering wheel (not shown) fixed to the rear end thereof is designed so as not to be contracted by the impact of a collision differently from the aforedescribed embodiments. The steering shaft 102 is inserted in a steering column 116. The housing 12 is connected to the fore end portion (lower left end portion in FIG. 14) of the steering column 116. The electric motor 11 which is the power source of a power steering device is supported by the housing 12. Then, a force in the direction of rotation is imparted to the steering shaft member 102a through a worm 13 and a worm wheel 14 by means of the motor 11. In the other points, this embodiment is similar to the aforedescribed embodiments.

The impact absorbing type steering column apparatus with a motorized power steering device according to the present invention is constructed and functions as described above and therefore, can achieve the ease of a design for increasing the amount of stroke of the steering wheel in order to prevent a great impact force from being applied to the driver's body during a secondary collision resulting from a collision accident, and to minimize injury to the driver while the flexural rigidity of the steering column is secured.

What is claimed is:

1. An impact absorbing type steering column apparatus with a motorized power steering device, comprising:
   a collapsible steering shaft to which a steering wheel is fixable at a rear end thereof;
   a collapsible steering column in which said steering shaft is rotatably received;
   a housing coupled to a fore end portion of said steering column;
   an electric motor supported by said housing;
   a mechanism disposed in said housing for transmitting a rotational force of said electric motor to said steering shaft;
   a first energy absorbing assembly supporting said steering column on a vehicle body and which allows forward collapsing movement of a part of said steering column in a forward direction while absorbing energy of an impact of a driver with the steering wheel; and
   a second energy absorbing assembly supporting said housing on the vehicle body such that said housing can be displaced in a forward direction to allow forward movement of said steering column and said steering shaft, and which absorbs additional energy of the impact of the driver with the steering wheel during the forward displacement of the housing.

2. An impact absorbing type steering column apparatus according to claim 1, wherein said second energy absorbing assembly includes a plastically deformable energy absorbing member through which said housing is supported on the vehicle body and which plastically deforms with the displacement of the housing in the forward direction to effect energy absorption.

3. An impact absorbing type steering column apparatus according to claim 2, wherein said second energy absorbing assembly further includes a first universal joint having one side thereof coupled to a fore end portion of said steering shaft which protrudes from a fore end of said housing, a transmission shaft having one end thereof coupled to another side of said first universal joint, and a second universal joint having one side thereof coupled to another end of said transmission shaft.

4. An impact absorbing type steering column apparatus according to claim 3, wherein said transmission shaft is collapsible.

5. An impact absorbing type steering column apparatus with a motorized power steering device, comprising:
   a steering shaft to which a steering wheel is fixable at a rear end thereof;
   a non-collapsible steering column in which said steering shaft is rotatably received;
   a housing coupled to a fore end portion of said steering column;
   an electric motor supported by said housing;
   a mechanism disposed in said housing for transmitting a rotational force of said electric motor to said steering shaft;
   a support assembly supporting said steering column on a vehicle body and which allows movement of the steering column in a forward direction in response to an impact of a driver with the steering wheel; and
   an energy absorbing assembly supporting said housing on the vehicle body such that said housing can be displaced in a forward direction to allow forward movement of said steering column and said steering shaft, and which absorbs energy of the impact of the driver with the steering wheel during the forward displacement of the housing.

6. An impact absorbing type steering column apparatus according to claim 5, wherein said energy absorbing assembly includes a plastically deformable energy absorbing member through which said housing is supported on the vehicle body and which plastically deforms with the displacement of the housing in the forward direction to effect energy absorption.

7. An impact absorbing type steering column apparatus according to claim 6, wherein said energy absorbing assembly further includes a first universal joint having one side thereof coupled to a fore end portion of said steering shaft which protrudes from a fore end of said housing, a transmission shaft having one end thereof coupled to another side of said first universal joint, and a second universal joint having one side thereof coupled to another end of said transmission shaft.

8. An impact absorbing type steering column apparatus according to claim 7, wherein said transmission shaft is collapsible.

* * * * *